Patented July 17, 1934

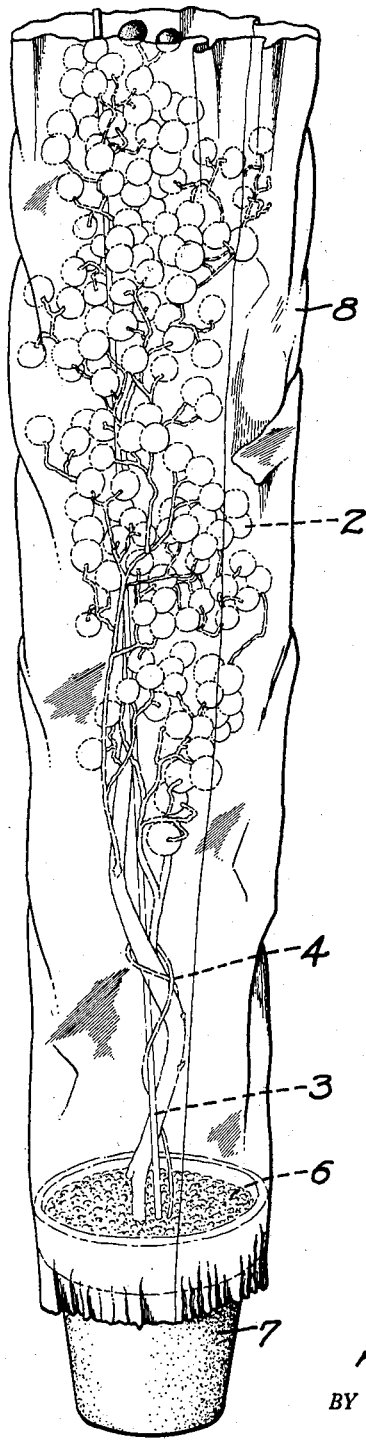

1,966,533

UNITED STATES PATENT OFFICE 1,966,533

DECORATION

Homer B. Willis, Oakland, Calif.

Application March 1, 1933, Serial No. 659,037

3 Claims. (Cl. 41—12)

My invention relates to a decoration, and more particularly to a floral display.

It is among the objects of my invention to improve the appearance and keeping qualities of a cluster of natural berries.

Another object of my invention is to provide a floral decoration simulating a potted plant.

Still another object of my invention is to provide means for protecting the decoration during shipment and handling.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

The figure of the drawing is a perspective view of a decoration embodying the improvements of my invention.

During the holiday seasons, and especially at Christmas time, clusters of red berries are used a great deal for purposes of decoration. The natural berries, while desirable in certain respects, have but a limited period of usefulness. The good appearance first presented is soon lost as the berries dry out and fade. Artificial berry clusters are more permanent and maintain their color, but the natural arrangement of berries in a cluster is difficult if not impossible to duplicate, and in artificial clusters the quality of realism is often lacking. Furthermore, artificial clusters involve a great deal of hand labor in their making, and are consequently expensive. The broad object of my invention is to provide an inexpensive cluster of berries which has both the permanence of an artificial cluster and the realistic arrangement of a natural cluster.

In terms of broad inclusion, the decoration embodying my invention comprises a cluster of natural berries treated with an impervious and preferably colored coating. The berries are preferably of a type which have a comparatively hard shell, such as pepper berries, and are preferably in a ripened state when coated. The coating is preferably of a material which is quick drying, and capable of producing a bright color with a high gloss, such as lacquer. The treated cluster is preferably enclosed in a sheath of transparent material for protecting the same during shipment and handling. When the cluster is mounted in a pot a pleasing decoration simulating a potted plant is provided.

In greater detail, the decoration embodying my invention comprises a cluster of natural berries preserved in a coating of impervious material. The coating may be of any desired color, or even transparent, and is preferably of a material which provides a high gloss, and which is quick drying, such as lacquer. Application of the coating material is preferably effected by means of a spray gun.

While any type of berry is susceptible to the treatment embodying my invention, I preferably employ a berry which has a comparatively hard shell, such as pepper berries. The hard shell of the pepper berry provides a good surface for the coating material, which aids the latter in presenting a high gloss finish. The berry clusters used in my ornament are preferably cut from the tree after they are thoroughly ripe, so that the shells are well hardened and the inner or pith portions are dried out.

As a Christmas decoration I have found that clusters of pepper berries coated with a good grade of bright red lacquer make excellent ornaments. Of course, any other color may be used, or, if the natural color of the berry is preferred, a transparent coating may be applied.

The figure in the drawing shows a berry cluster mounted in a pot to simulate a potted plant. The berry cluster 2 is preferably secured to an upwardly extending wire support 3 by means of a small length of wire 4. The support 3 is embedded in a filling 6 provided in the pot 7. Any suitable material, such as plaster of Paris, may be employed for the filling 6.

The cluster 2 is preferably sprayed with the coating material after it has been mounted in the pot, so that the support and fastening wires are also covered. The surface of the filling 6 and the pot 7 is also preferably painted, and if the color of these is to be the same as that of the cluster the entire ornament may be sprayed at one time.

A sheath is preferably provided for protecting the cluster during shipment and handling. This sheath preferably comprises a transparent sheet of material, such as "Cellophane", and, as applied to a potted cluster, is preferably in the nature of an open ended tubular wrapping 8 adapted to surround the cluster and pot. The sheath is sufficiently long to cover the cluster, and is of such diameter that it will fit snugly over the pot. By this arrangement the sheath derives its support primarily from the pot.

The transparent sheath protects the cluster during shipment and handling, and at the same time permits inspection of the ornament at any time. In this way the ornament is protected until actual use by a purchaser. Before actual use of course, the sheath is slipped off over the end of the cluster.

While I have specified lacquer as being the preferred coating material for the berry cluster, it is understood that other paints, such as enamel, or ordinary paint, may be employed. For a transparent coating, varnish or other similar materials may be employed.

An important feature of my invention resides in the fact that the paint coating provides a tough film which increases the mechanical tie between the berry and its stem. This is important because the natural cluster when dry is not particularly strong. The coating however provides a substantially permanent bond between the berry and stem. The mechanical strength together with the protection against moisture afforded the cluster by the tough impervious coating provides a decoration which will last many years.

I claim:

1. An article of manufacture comprising a cluster of dry pepper berries covered with a tough impervious coating to tie the berries to their stems.

2. An article of manufacture comprising a cluster of natural berries, a support extending through the cluster, and a coating of tough paint over the entire to bond the berries and stems together and to the support.

3. An article of manufacture comprising a cluster of natural berries, a wire support extending through the cluster, and a coating of lacquer over the entire to bond the berries and stems together and to the support.

HOMER B. WILLIS.